(12) United States Patent
Gretz

(10) Patent No.: US 9,853,433 B1
(45) Date of Patent: Dec. 26, 2017

(54) ADJUSTABLE FLOOR ELECTRICAL BOX ASSEMBLY

(71) Applicant: Thomas J. Gretz, Port St. Lucie, FL (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 389 days.

(21) Appl. No.: 13/736,488

(22) Filed: Jan. 8, 2013

Related U.S. Application Data

(60) Provisional application No. 61/716,087, filed on Oct. 19, 2012.

(51) Int. Cl.
*H02G 3/18* (2006.01)
(52) U.S. Cl.
CPC .................................. *H02G 3/185* (2013.01)
(58) Field of Classification Search
CPC ...................................................... H02G 3/185
See application file for complete search history.

(56) References Cited

U.S. PATENT DOCUMENTS

| | | | | | |
|---|---|---|---|---|---|
| 3,956,573 | A | * | 5/1976 | Myers | H02G 3/185 174/488 |
| 5,272,278 | A | * | 12/1993 | Wuertz | H02G 3/185 174/484 |
| 6,395,978 | B1 | * | 5/2002 | Whitehead | H02G 3/185 174/50 |
| 7,312,395 | B1 | * | 12/2007 | Gretz | 174/54 |
| 8,076,578 | B1 | * | 12/2011 | Gretz | H02G 3/126 174/50 |
| 8,250,773 | B1 | * | 8/2012 | Shotey | H02G 3/00 33/528 |
| 2009/0014196 | A1 | * | 1/2009 | Peck | 174/54 |

* cited by examiner

*Primary Examiner* — Dhirubhai R Patel

(57) ABSTRACT

An adjustable floor box assembly including: 1) an electrical box having a front edge, a sidewall and opposing vertical edges, electrical box vertical channels at the opposing sidewall vertical edges; a bolt guide on the sidewall adjacent the front edge in vertical alignment with a slot in the sidewall; and 2) an adjustable flange including: a) a horizontal member including, an aperture for the insertion of a threaded adjustment bolt; and b) an integral vertical member having vertical flange edges and flange channels on the vertical flange edges that slidably engage the vertical channels, and at least one adjustment bolt engagement member that engages the threads of an threaded adjustment bolt inserted through the bolt guide, so that, as the adjustment bolt is rotated, the adjustable flange moves slidably up and down as the vertical flange edges and flange channels move slidably in the electrical box vertical channels.

1 Claim, 6 Drawing Sheets

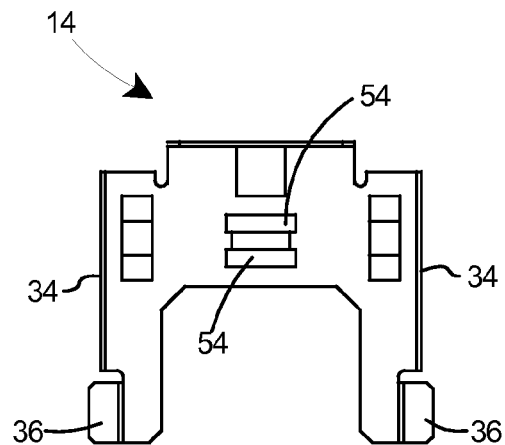
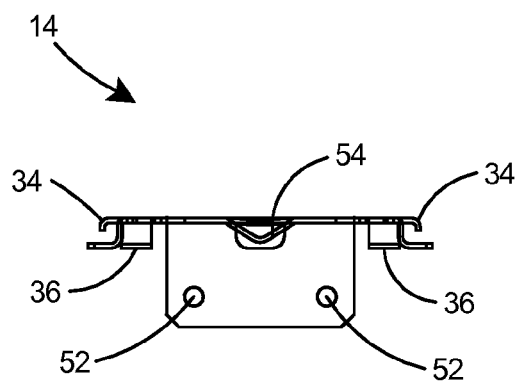
Fig. 5
Fig. 6
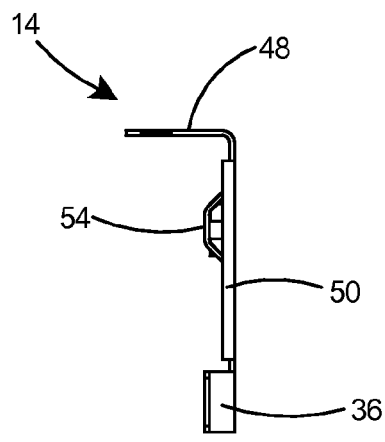
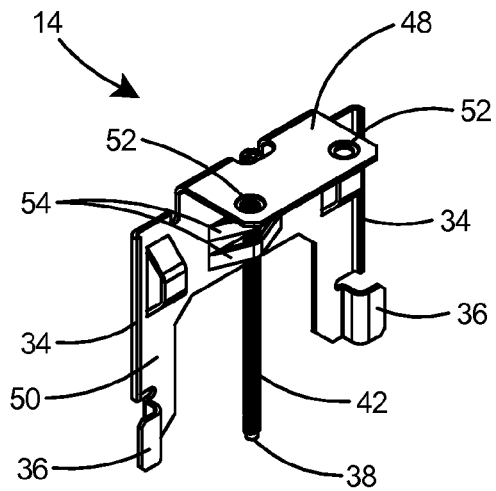
Fig. 7
Fig. 8

ADJUSTABLE FLOOR ELECTRICAL BOX ASSEMBLY

This application claims the priority of U.S. Provisional Patent Application Ser. No. 61/716,087 filed Oct. 19, 2012.

FIELD OF THE INVENTION

The present invention relates to floor mount electrical boxes and more particularly to an adjustable floor mount electrical box.

BACKGROUND OF THE INVENTION

The location and mounting of electrical boxes in floors has always posed a difficult problem due to the greatly varying thickness of flooring materials and flooring construction into which the floor mounted electrical box is to be installed. Such installations generally require the inventorying of a variety of electrical boxes of varying depth or the use of such electrical boxes that include the ability to shorten the depth of the box on site. The latter solution results in the necessity of having two piece electrical boxes that include a separate rear member for closing the electrical box once the proper depth has been determined.

OBJECT OF THE INVENTION

It is therefore an object of the present invention to provide a floor mounted electrical box that is readily adjustable to meet the thickness or depth requirements of any particular installation without the need to inventory a selection of electrical boxes of varying depths or the use of separate rear members to close a standard length electrical box once the appropriate depth has been determined for a particular installation.

SUMMARY OF THE INVENTION

According to the present invention, there is provided an adjustable floor box assembly including: 1) an electrical box having a front edge, a sidewall and opposing vertical edges, electrical box vertical channels at the opposing sidewall vertical edges; a bolt guide on the sidewall adjacent the front edge in vertical alignment with a slot in the sidewall; and 2) an adjustable flange including: a) a horizontal member including, an aperture for the insertion of a threaded adjustment bolt; and b) an integral vertical member having vertical flange edges and flange channels on the vertical flange edges that slidably engage the vertical channels, and at least one adjustment bolt engagement member that engages the threads of an threaded adjustment bolt inserted through the bolt guide, so that, as the adjustment bolt is rotated, the adjustable flange moves slidably up and down as the vertical flange edges and flange channels move slidably in the electrical box vertical channels. The adjustable floor box of the present invention can be adjustably mounted into a floor after application of the face plate.

BRIEF DESCRIPTION OF THE DRAWINGS

Reference is made herein to the accompanying drawings which are not necessarily to scale, and wherein:

FIG. 5 is a front view of the mounting flange portion of the adjustable floor box assembly of the present invention;

FIG. 6 is a top view of the mounting flange portion of the adjustable floor box assembly of the present invention;

FIG. 7 is a side view of the mounting flange portion of the adjustable floor box assembly of the present invention;

FIG. 8 is a perspective view of the mounting flange portion of the adjustable floor box assembly of the present invention;

DETAILED DESCRIPTION

The invention comprises a floor mounted electrical outlet box whose depth can be adjusted to meet the requirements of varying flooring situations.

Figure 1:
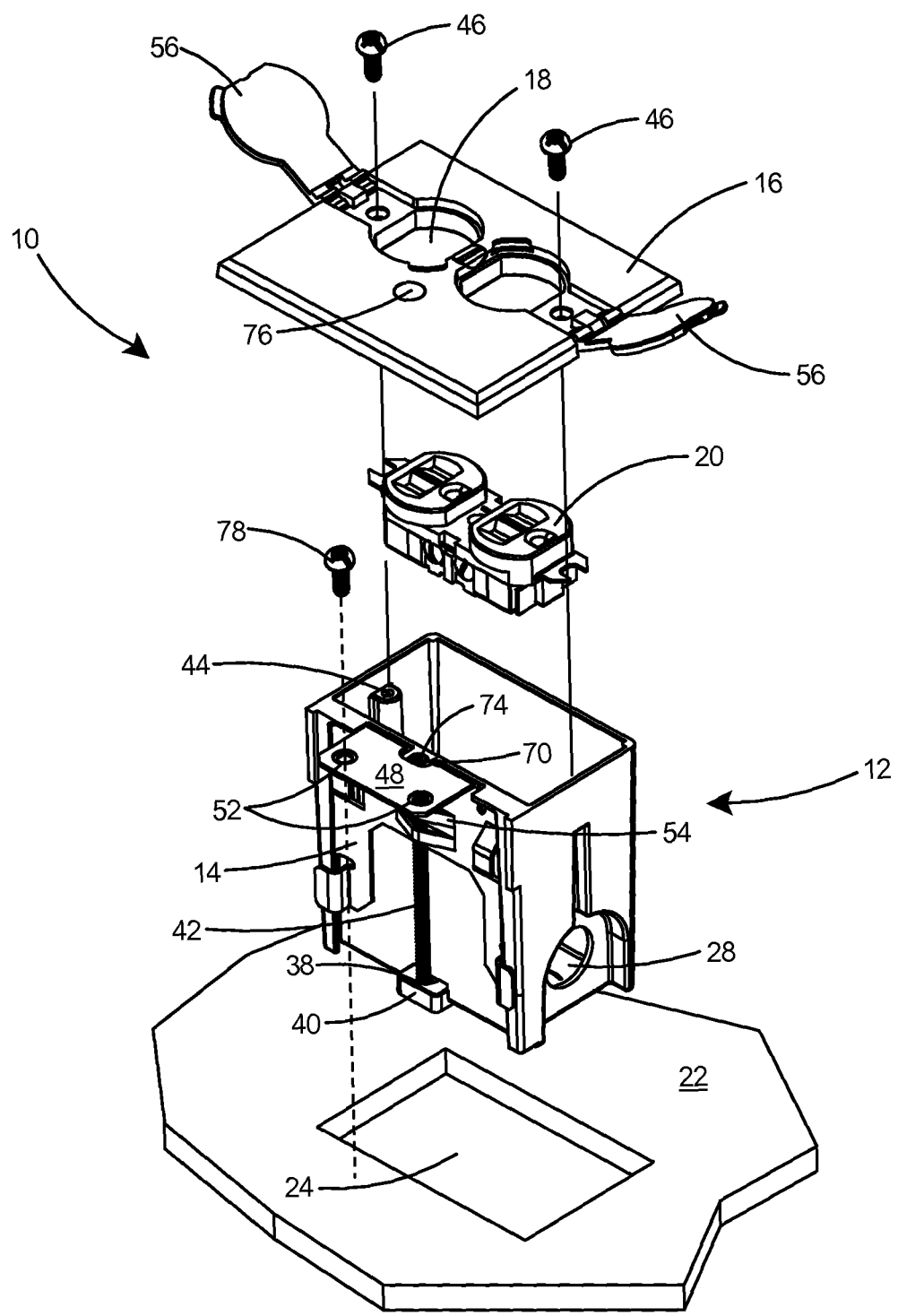
FIG. 1 is an exploded view of the adjustable floor box assembly of the present invention.

Referring now to the accompanying Figures, as shown in the exploded view of the adjustable floor box assembly 10 of the present invention depicted in FIG. 1, adjustable floor box assembly 10 comprises an electrical box 12, an adjustable flange 14, and a suitable cover plate 16 including openings 18 for the access of duplex receptacle 20. With reference to FIG. 1 there is shown a cutaway portion of a floor 22 including an aperture 24, which has been cut into the floor, and into which adjustable floor box assembly 10 is to be installed.

Figure 2:
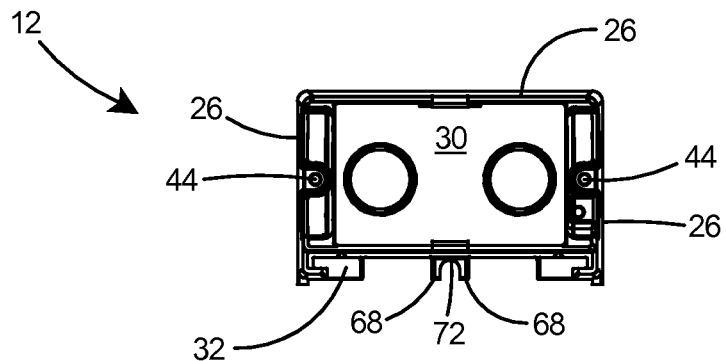
FIG. 2 is a top view of an electrical box that forms a portion of the adjustable floor box assembly of FIG. 1.
Figure 3:
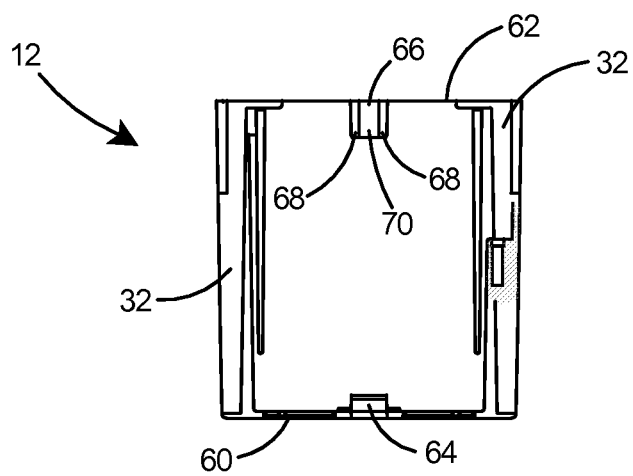
FIG. 3 is a side view of the electrical box portion of the adjustable floor box assembly of the present invention.
Figure 4:
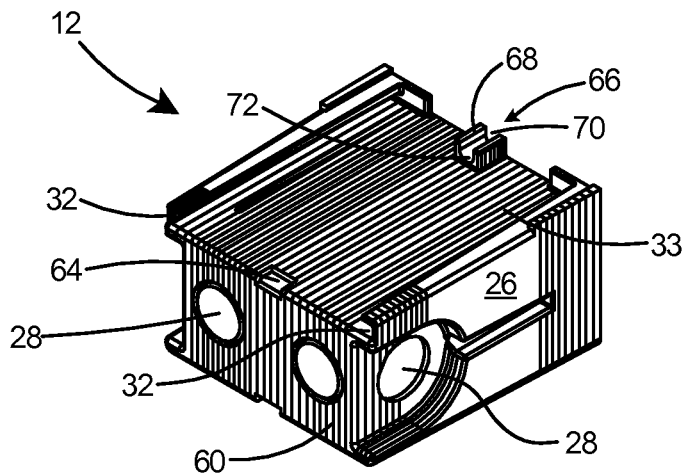
FIG. 4 is a perspective view of the electrical box portion of the adjustable floor box assembly of the present invention.
Figure 11:
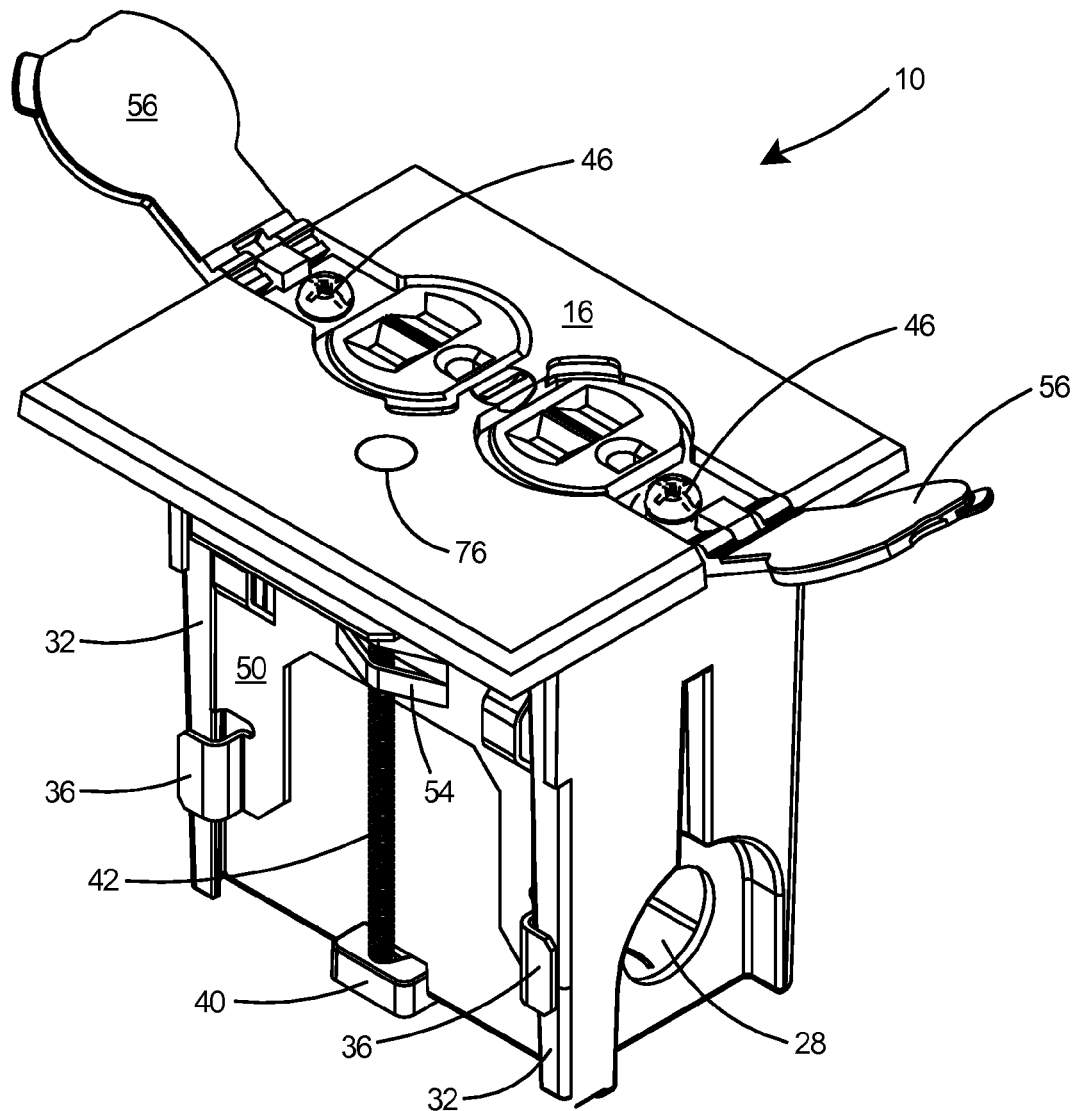
FIG. 11 is a perspective view of a fully assembled adjustable floor box assembly in accordance with the present invention.

As shown in greater detail in FIGS. 2-4, electrical box 12 includes a plurality of sidewalls 26, at least two apertures, and preferably more, 28 that provide access to interior 30 of electrical box 12 for insertion of appropriate wiring or cabling (not shown). Electrical box 12 also includes channels 32 on its exterior 33 for the adjustable insertion and guidance of edge portions 34 and channel portions 36 of adjustable flange 14 shown in FIGS. 5-8 and described in greater detail below. A bolt receiver 40 is also provided for the containment of extremity 38 of adjustment bolt 42, best seen in FIGS. 1, 8 and 11. Screw receiving apertures 44 are also provided for the installation of screws 46 for the attachment of duplex receptacle 20 and cover plate 16 as best seen in FIGS. 1, 8, and 11. While adjustable floor box assembly 10 is depicted in the various Figures as being generally rectangular, it will be readily understood that electrical box 12 as well as cover plate 16 can both be round, octagonal or any other appropriate shape without departing from the spirit of the invention.

Referring now to FIGS. 5-8 which depict various aspects of adjustable flange 14, adjustable flange 14 includes an integral horizontal member 48 and an integral vertical member 50. Flange horizontal member 48 includes apertures 52 for the insertion of fasteners to attach adjustable floor box assembly 10 to a floor 22 into which it is being installed. Flange vertical member 50 includes edges 34 and channels 36 that slidably engage the interiors and exteriors of channels 32 in electrical box 12. Vertical member 50 further includes at least one and preferably a plurality of adjustment bolt engagement portions 54 that can be formed by deforming vertical member 50 or separately attached thereto.

As shown in FIG. 1, adjustment bolt engagement portions 54 engage the threads of adjustment bolt 42 so that, as adjustment bolt 42 is turned, adjustable flange 14 moves slidably up and down with respect to the electrical box 12 as edges 34 and channels 36 move slidably in channels 32. In this fashion, the vertical location of horizontal member 48 is altered relative to the location of electrical box 12, thus providing accurate adjustment of adjustable floor box assembly 10 with respect to the floor surface. The adjustment is especially useful when floors are later finished with various materials, such as carpet, laminate, or tile. The adjustable floor box assembly 20 enables an installer to secure the assembly to the unfinished floor during construction and later easily adjust the floor box assembly to bring the cover plate substantially level with the newly installed floor surface.

Figure 9:
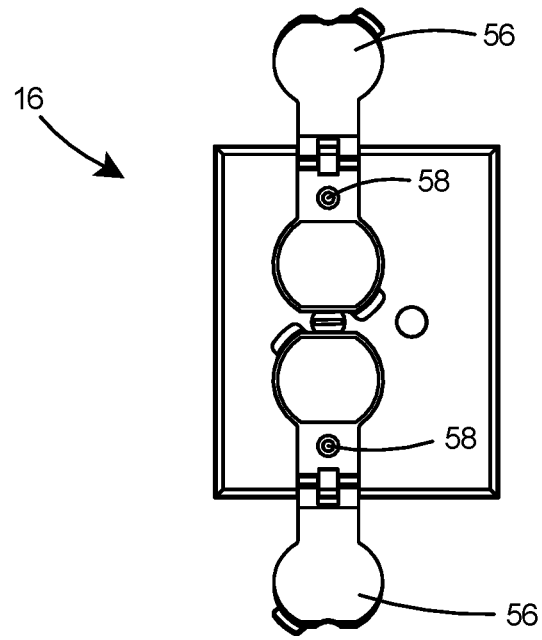
FIG. 9 is a top view of the cover plate portion of the adjustable floor box assembly of the present invention.
Figure 10:
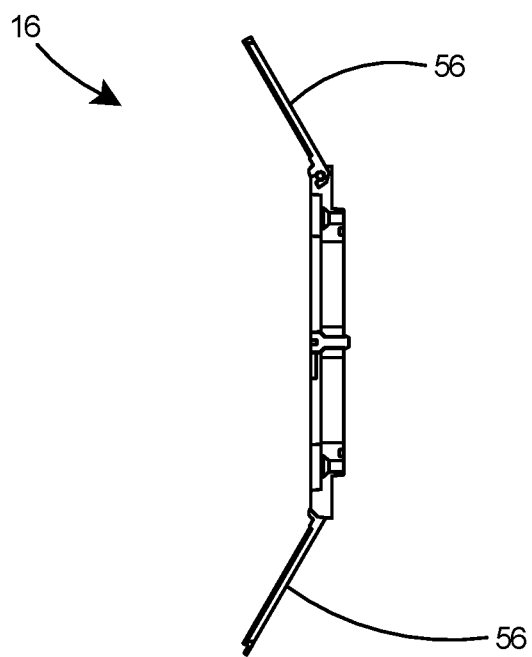
FIG. 10 is a side view of the cover plate portion of the adjustable floor box assembly of the present invention.

Referring now to FIGS. 9 and 10, shown in these Figures are two views of cover plate 16. FIGS. 9 and 10 depict front and side views of cover plate 16 with springably mounted outlet covers 56 in the open position. Cover plate 16 includes apertures 58 for the insertion of attachment screws 46 (see FIG. 1) into screw receiving apertures 44 in electrical box 12.

As shown in FIGS. 2 and 3, electrical box 12 further includes a back wall 60, a front edge 62, and a slot 64 in sidewall 26 adjacent the back wall. A bolt guide 66 is provided on the sidewall 26 adjacent the front edge 62 of the electrical box 12. The bolt guide includes two parallel wings 68 forming a notch 70 therein. Notch 70 is in axial alignment with slot 64. The notch 70 includes an arcuate seat 72 for accommodating and guiding the adjustment bolt 42 (see FIG. 1) when it is threaded within adjustment bolt engagement portions 54.

Figure 12:
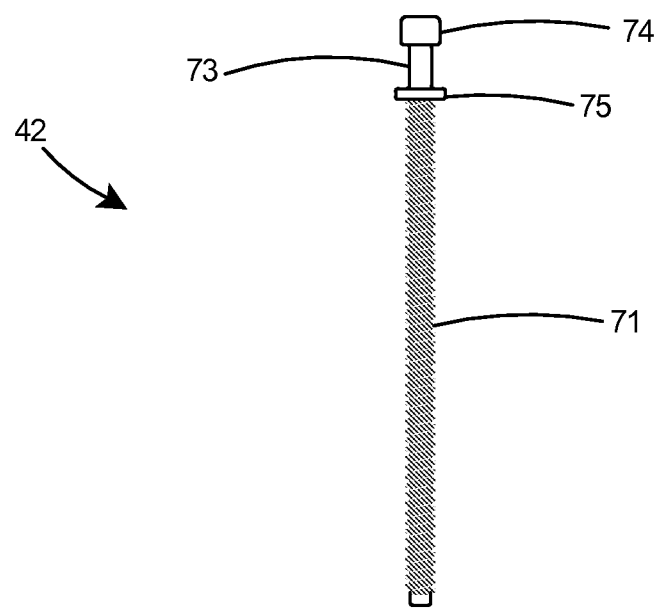
FIG. 12 is a front elevation view of an adjustment bolt in accordance with the present invention.
Figure 13:
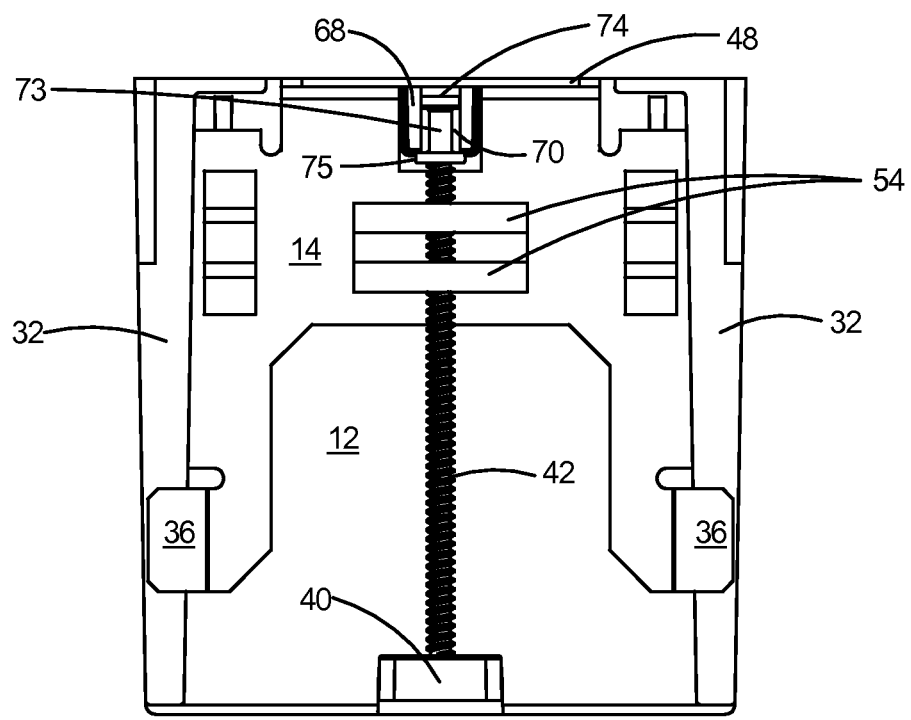
FIG. 13 is a side view of the electrical box assembly depicting the side with the adjustable flange.

With reference to FIG. 12, adjustment bolt 42 includes a threaded portion 71, a head 74, a smooth neck 73, and a peripheral ring 75. As shown in FIG. 13, head 74 of adjustment bolt 42 nests within notch 70 of electrical box 12. Peripheral ring 75 seats against parallel wings 68 and contains adjustment bolt 42 in place between wings 68 and bolt receiver 40 thereby enabling electrical box 12 to move with respect to adjustable flange 14 as adjustment bolt is turned 42. Thus, once horizontal member 48 of adjustment flange 14 is secured to the floor, clockwise movement of adjustment bolt 42 will draw electrical box closer to the floor surface and counterclockwise movement of adjustment bolt 42 will extend the electrical box farther out from the floor surface.

As shown in FIG. 11, cover plate 16 includes an aperture 76 therein which, when cover plate 16 is secured to electrical box 12, is in axial alignment with adjustment bolt 42. The aperture 76 enables an installer to access and turn adjustment bolt 42, as shown in FIG. 11, after cover plate 16 is secured to electrical box. Thus, as shown in FIG. 1, flange horizontal member 48 may be secured to the floor substrate at any time prior to finishing the floor by fasteners 78 secured through apertures 52 and, after installation of a floor finish such as tile, the adjustable floor box assembly 10 may be adjusted with respect to the new floor surface without having to remove cover plate 16 from electrical box 12. As shown in FIG. 11, the installer simply inserts a tool such as a screwdriver through aperture 76 in order to adjust the height of the assembly 10 with respect to the floor surface.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An adjustable floor box comprising:
   an electrical box including a front edge and a first sidewall having first channels and a bolt receiver;
   an adjustable flange engaged in said first channels of said first sidewall, said adjustable flange slideable with respect to said first sidewall, said adjustable flange including edges and second channels;
   said adjustable flange including a flange member substantially planar with respect to said front edge of said electrical box and a bolt engagement portion, said flange member including a notch therein;
   an adjustment bolt extending between said flange member and said bolt receiver, said adjustment bolt including threads and a head;
   said bolt engagement portion of said adjustable flange engaging the threads of said adjustment bolt thereby enabling adjustable flange to slide up and down with respect to said electrical box as said edges and said second channels of said adjustable flange move slidably in said first channels of said electrical box thereby altering the vertical location of said flange member relative to the location of said electrical box and providing accurate adjustment of said adjustable floor box assembly with respect to a floor surface;
   said notch in said adjustable flange enabling access to the head of said adjustment bolt;
   a cover plate secured to said front edge of said electrical box, said cover plate including outlet covers and an access hole; and
   said access hole of said cover plate axially aligned with said adjustment bolt enabling rotation of said adjustment bolt to adjust the depth of said adjustable floor box within a floor.

* * * * *